(12) United States Patent
Zheng et al.

(10) Patent No.: US 10,241,868 B2
(45) Date of Patent: Mar. 26, 2019

(54) SERVER CONTROL METHOD AND SERVER CONTROL DEVICE

(71) Applicant: Huawei Technologies Co., Ltd., Shenzhen (CN)

(72) Inventors: Genqiang Zheng, Hangzhou (CN); Dixuan Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 445 days.

(21) Appl. No.: 14/675,035

(22) Filed: Mar. 31, 2015

(65) Prior Publication Data

US 2015/0205676 A1  Jul. 23, 2015

Related U.S. Application Data

(63) Continuation of application No. PCT/CN2013/084638, filed on Sep. 29, 2013.

(51) Int. Cl.
*G06F 11/00* (2006.01)
*G06F 11/14* (2006.01)
(Continued)

(52) U.S. Cl.
CPC ........ *G06F 11/1438* (2013.01); *G06F 9/4406* (2013.01); *G06F 11/0721* (2013.01);
(Continued)

(58) Field of Classification Search
CPC .. G06F 11/1438; G06F 11/30; G06F 11/0721; G06F 11/0793; G06F 11/1414;
(Continued)

(56) References Cited

U.S. PATENT DOCUMENTS 4,989,130 A * 1/1991 Moriyama .......... G06F 11/1658
714/48
5,748,877 A * 5/1998 Dollahite ................ G06F 11/22
714/36
(Continued)

FOREIGN PATENT DOCUMENTS

CN  101216793 A  7/2008
CN  102446149 A  5/2012
(Continued)

OTHER PUBLICATIONS

Foreign Communication From a Counterpart Application, European Application No. 13892785.0, Extended European Search Report dated Sep. 21, 2016, 12 pages.
(Continued)

*Primary Examiner* — Jason B Bryan
(74) *Attorney, Agent, or Firm* — Conley Rose, P.C.

(57) ABSTRACT

A control method implemented using a server and a server control device. When a server starts abnormally due to an exception of a master central processing unit (CPU), a platform controller hub (PCH) connected to the master CPU, or a Flash that is connected to the PCH connected to the master CPU, the master CPU is reconfigured. It is implemented that, when a startup exception occurs on a server that supports hard partitioning, it can be still ensured that the server normally starts and runs, thereby improving reliability and stability of the server. Therefore, Reliability, Availability and Serviceability (RAS) of the entire server is improved. In addition, a problem that a system fails to run due to an exception of a Flash is solved, and an original dual Basic Input/Output Systems (BIOS) design manner may no longer be used, thereby reducing Flash chip costs of the server.

16 Claims, 3 Drawing Sheets

(51) Int. Cl.
*G06F 9/4401* (2018.01)
*G06F 11/07* (2006.01)

(52) U.S. Cl.
CPC ...... *G06F 11/0793* (2013.01); *G06F 11/1417* (2013.01); *G06F 11/1441* (2013.01)

(58) Field of Classification Search
CPC ...... G06F 9/4406; G06F 9/4403; G06F 9/441; G06F 11/1417; G06F 9/1441
See application file for complete search history.

(56) References Cited

U.S. PATENT DOCUMENTS

| | | | |
|---|---|---|---|
| 5,790,850 | A | 8/1998 | Natu |
| 8,453,004 | B2* | 5/2013 | Kobayashi ............ G06F 1/22 713/500 |
| 2002/0133693 | A1 | 9/2002 | Morrison et al. |
| 2003/0126498 | A1* | 7/2003 | Bigbee ............ G06F 11/0712 714/10 |
| 2004/0221198 | A1 | 11/2004 | Vecoven |
| 2007/0011311 | A1 | 1/2007 | Kawaji et al. |
| 2008/0155331 | A1 | 6/2008 | Rothman et al. |
| 2009/0172228 | A1 | 7/2009 | Zimmer et al. |
| 2010/0211767 | A1* | 8/2010 | Chu ............ G06F 11/1417 713/2 |
| 2010/0250822 | A1* | 9/2010 | Lin ............ G06F 11/2017 710/316 |
| 2011/0154106 | A1* | 6/2011 | Kelly ............ G06F 11/1417 714/10 |
| 2011/0191539 | A1* | 8/2011 | Hugosson ............ G06F 12/08 711/118 |
| 2012/0025953 | A1 | 2/2012 | Swanson et al. |
| 2012/0079118 | A1 | 3/2012 | Bailey et al. |
| 2012/0173922 | A1* | 7/2012 | Cheng ............ G06F 11/1417 714/13 |

FOREIGN PATENT DOCUMENTS

| | | |
|---|---|---|
| CN | 102521209 A | 6/2012 |
| CN | 102768561 A | 11/2012 |
| CN | 202838091 U | 3/2013 |
| CN | 103019323 A | 4/2013 |
| CN | 103077060 A | 5/2013 |
| CN | 103154916 A | 6/2013 |
| GB | 2351820 A | 1/2001 |
| JP | 2000076216 A | 3/2000 |
| JP | 2011134314 A | 7/2011 |
| JP | 2013054434 A | 3/2013 |
| WO | 9408291 A1 | 4/1994 |

OTHER PUBLICATIONS

Foreign Communication From a Counterpart Application, Japanese Application No. 2016504451, Japanese Notice of Allowance dated Oct. 4, 2016, 3 pages.
Partial English Translation and Abstract of Chinese Patent Application No. CN101216793A, Mar. 30, 2015, 6 pages.
Foreign Communication From a Counterpart Application, PCT Application No. PCT/CN2013/084638, English Translation of International Search Report dated Jun. 30, 2014, 2 pages.
Foreign Communication From a Counterpart Application, European Application No. 13892785.0, European Partial Supplementary European Search Report dated Jun. 3, 2016, 6 pages.
Gonzales, J., "USB ID Pin-DM3c DaVinci Video Processor Forum-DaVinci(TM) Video Processors—TI E2E , Community," XP055372616, Aug. 25, 2009, 6 pages.
Foreign Communication From a Counterpart Application, European Application No. 13892785.0, European Office Action dated May 18, 2017, 5 pages.
Machine Translation and Abstract of Chinese Publication No. CN102446149, May 9, 2012, 13 pages.
Machine Translation and Abstract of Chinese Publication No. CN102521209, Jun. 27, 2012, 14 pages.
Machine Translation and Abstract of Chinese Publication No. CN102768561, Nov. 7, 2012, 14 pages.
Machine Translation and Abstract of Chinese Publication No. CN202838091, Mar. 27, 2013, 12 pages.
Foreign Communication From a Counterpart Application, Chinese Application No. 201510811081.8, Chinese Search Report dated Dec. 27, 2017, 2 pages.

* cited by examiner

SERVER CONTROL METHOD AND SERVER CONTROL DEVICE

CROSS-REFERENCE TO RELATED APPLICATIONS

This application is a continuation of International Application No. PCT/CN2013/084638, filed on Sep. 29, 2013, which is hereby incorporated by reference in its entirety.

TECHNICAL FIELD

The present invention relates to the field of information technologies, and in particular, to a server control method and a server control device.

BACKGROUND

A server is a high-performance computer in a network environment and is capable of listening to a service request submitted by another computer (client) on a network and providing a corresponding service. According to a system architecture, servers are mainly divided into two categories: non-x86 servers and X86 servers. An X86 server is also called a complex instruction set architecture server, generally called a personal computer (PC) server. The X86 server is a server that is based on a PC system architecture and uses an Intel® processor chip or another processor chip compatible with an x86 instruction set.

With further development of information technology, a server becomes increasingly important in daily information technology (IT) applications, and the number of services that a server bears is also increasing. An exception or a breakdown of a server may usually bring an extremely huge loss to a customer. Therefore, no matter if it is for a general server or a key application server, a Reliability, Availability and Serviceability (RAS) feature of the server becomes increasingly important.

The RAS is an important indicator of a server. How to achieve that a server has not only a great RAS feature but also a relatively high cost performance ratio is a major focus in server development. Especially for a mid-range or high-end server, a complete RAS feature is a major indicator for measuring whether the server is a high-end server.

For a common mid-range or high-end X86 server or a higher-end midrange computer, the server is generally required to support hard partitioning. The hard partitioning is to separate one server into several completely independent subservers. Each of these subservers is one complete server system. These subservers have their own Basic Input/Output Systems (BIOSs) and operating systems, which is similar to a generally called single server. For example, one 8-socket X86 server is hard partitioned into two 4-socket servers or four 2-socket servers, and a server that is obtained by separation by means of hard partitioning can run independently, be powered on independently, be powered off independently, and be managed independently.

Generally, an X86 server mainly includes multiple components, such as a Central Processing Unit (CPU), a Platform Controller Hub (PCH), a memory, a hard disk, and a card. For an X86 server that supports a hard partitioning function, multiple PCH chips need to be configured. Generally, the number of PCH chips that need to be configured varies depending on the number of hard partitions supported by a system. FIG. 1A is a system framework of one 8-socket server, and FIG. 1B is a system framework of one 8-socket server that is hard partitioned into two 4-socket servers.

FIG. 1A shows an independent 8P mode. A PCH connected to a CPU1 is a master PCH, and a PCH connected to another processor is a slave PCH. The slave PCH has two working modes: (1) The PCH is disabled and cannot provide any function externally. (2) The PCH is in a state in which some functions are available, for example, a universal serial bus (USB) or serial AT attachment (SATA) function on the PCH is still available but the PCH cannot participate in a management function of the entire server.

FIG. 1B shows a partitioned 8P mode. Four CPUs and a PCH that are at the top form one independent system, and four CPUs and a PCH that are at the bottom form one independent system. Quick Path Interconnect (QPI) connections between the two systems are disconnected, and there is no task interaction between the two systems.

In the prior art, RAS of a system has a relatively big disadvantage. When partitioning is not performed on a server, if a master PCH connected to a CPU1 is abnormal (for example, a chip is damaged), or an exception (for example, a chip is damaged, or a BIOS in which a Flash is located is abnormally erased) occurs on the Flash connected to the master PCH, the entire server is in a breakdown state. In this case, a service that runs on the server is interrupted.

SUMMARY

Embodiments of the present invention provide a server control method and a server control device, which ensure normal operation of a service when a server starts abnormally.

An embodiment of the present invention provides a control device in a server, where the server includes at least two CPUs and at least two PCHs, and each of the PCHs is connected to at least one of the CPUs; and the control device includes a configuring unit configured to configure labels of the CPUs and mark one of the CPUs as a master CPU; and when the server starts abnormally, configure a normal CPU or a CPU connected to a normal PCH as a master CPU, where that the server starts abnormally includes a startup exception of a BIOS caused by an exception of the master CPU, a PCH connected to the master CPU, or a Flash that is connected to the PCH connected to the master CPU; and a restarting unit configured to, when the server starts abnormally, trigger the server to restart, and trigger the configuring unit to configure the normal CPU or the CPU connected to the normal PCH as the master CPU.

As an optional implementation manner, the configuring unit includes a pin configuring unit configured to configure pins of the at least two CPUs, and configure one of the CPUs as the master CPU by configuring values of the pins; and an information receiving unit, configured to receive information that is about a startup exception of the server and sent by the restarting unit, and trigger the pin configuring unit to configure the normal CPU or the CPU connected to the normal PCH as the master CPU.

As an optional implementation manner, the restarting unit includes a determining unit, configured to determine whether the server starts abnormally within preset time; and a triggering unit, configured to, when the determining unit determines that the server starts abnormally, trigger the server to restart, and trigger the configuring unit to configure the normal CPU or the CPU connected to the normal PCH as the master CPU.

As an optional implementation manner, the triggering unit includes a first triggering unit, configured to, when the server starts abnormally, trigger, using a register preset in the BIOS, the server to restart; and a second triggering unit, configured to, in a restart process of the server, determine whether exception information that causes the server to abnormally start exists; and when the exception information exists, trigger the configuring unit to configure the normal CPU or the CPU connected to the normal PCH as the master CPU, where the exception information is information triggered, by the BIOS, to be recorded before the server restarts.

As an optional implementation manner, the server is a server that supports a hard partitioning function, and the pins of the CPUs in the server are connected to the control device.

As an optional implementation manner, the control device is implemented in a complex programmable logical device (CPLD) or a field programmable gate array (FPGA) of the server.

An embodiment of the present invention further provides a server control method, where the method is applied to a server, the server includes at least two CPUs and at least two PCHs, and each of the PCHs is connected to at least one of the CPUs; and the method includes configuring labels of the CPUs, and marking one of the CPUs as a master CPU; determining whether the server starts abnormally; if the server starts abnormally, recording exception information and triggering the server to restart, where the exception information includes a startup exception of a BIOS caused by an exception of the master CPU, a PCH connected to the master CPU, or a Flash that is connected to the PCH connected to the master CPU; and in a restart process of the server, configuring a normal CPU or a CPU connected to a normal PCH as the master CPU according to the recorded exception information.

As an optional implementation manner, the configuring labels of the CPUs is configuring pins of the CPUs, and the marking one of the CPUs as a master CPU is configuring one of the CPUs as the master CPU by configuring values of the pins.

As an optional implementation manner, the determining whether the server starts abnormally includes setting a timer, where duration of the timer is less than timer duration of a watchdog of the server; and in a startup process of the server, if the watchdog is not disabled within time that is set for the timer, determining that the server starts abnormally.

As an optional implementation manner, the method is implemented by a CPLD or a FPGA.

As an optional implementation manner, the triggering the server to restart is triggering, using a restart register disposed in the CPLD or the FPGA, the server to restart.

As an optional implementation manner, the server is a server that supports a hard partitioning function, and the pins of the CPUs in the server are connected to the CPLD or the FPGA.

According to the control method and the server control device in the embodiments of the present invention, when a server starts abnormally due to an exception of a master CPU, a PCH connected to the master CPU, or a Flash that is connected to the PCH connected to the master CPU, pins of CPUs are reconfigured, the master CPU of the server is changed, and a BIOS acquires an instruction from a Flash connected to a new master PCH and executes the instruction at the time of startup. It is implemented that, when a startup exception occurs on a server that supports hard partitioning, it can be still ensured that the server normally starts and runs, thereby improving reliability and stability of the server. Therefore, RAS of the entire server is improved. In addition, a problem that a system fails to run due to an exception of a Flash is solved, and an original dual BIOS design manner may no longer be used, thereby reducing Flash chip costs of the server.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1A:
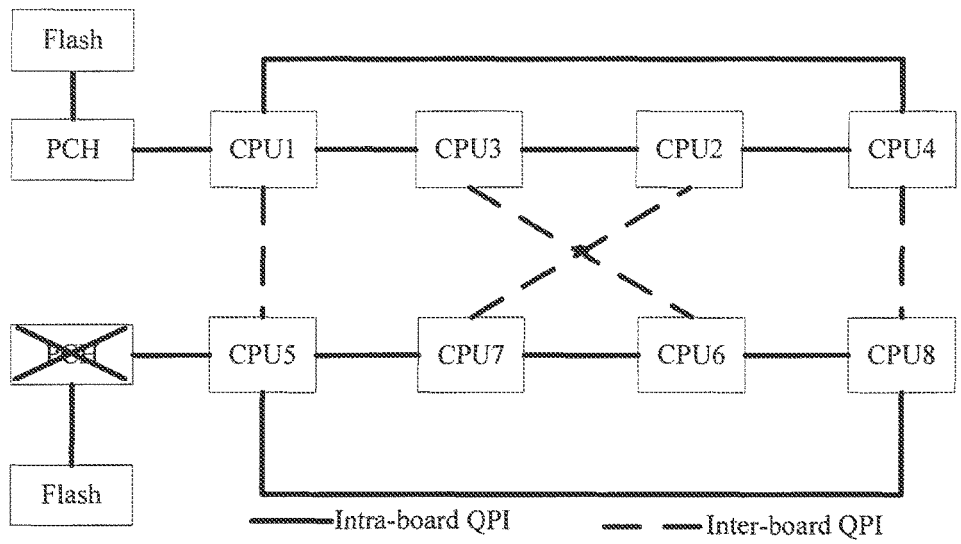
FIG. 1A is a schematic structural diagram of a server system in the prior art.
Figure 1B:
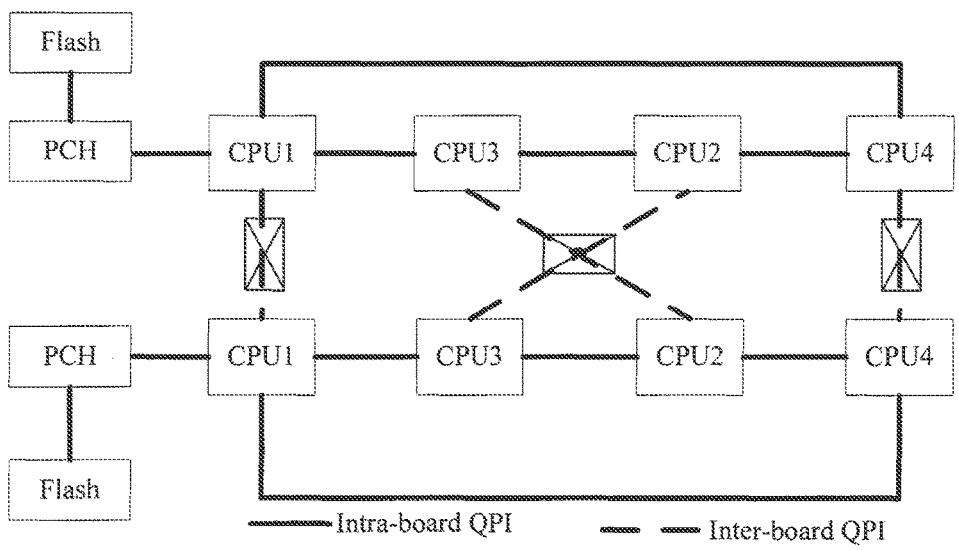
FIG. 1B is a schematic structural diagram of another server system in the prior art.
Figure 2:
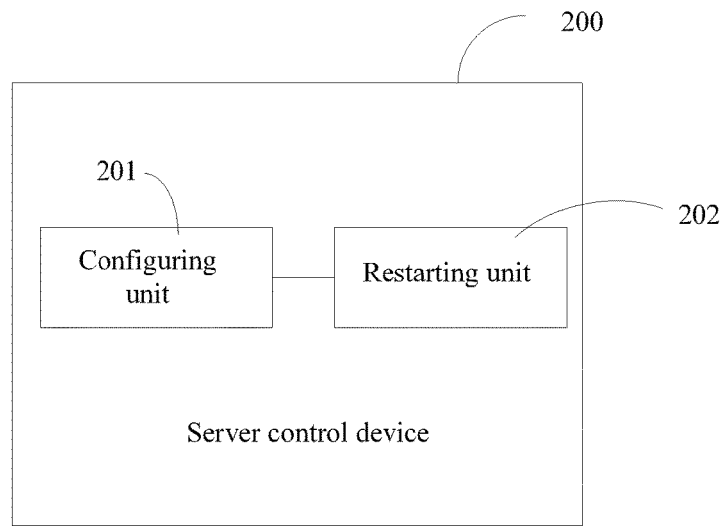
FIG. 2 is a schematic structural diagram of a server control device according to an embodiment of the present invention.

FIG. 2 is a schematic structural diagram of a control device 200 in a server according to an embodiment of the present invention, where the server includes at least two CPUs and at least two PCHs, and each of the PCHs is connected to at least one of the CPUs; and the control device 200 includes a configuring unit 201 configured to configure labels of the CPUs and mark one of the CPUs as a master CPU; and when the server starts abnormally, configure a normal CPU or a CPU connected to a normal PCH as a master CPU, where that the server starts abnormally includes a startup exception of a BIOS caused by an exception of the master CPU, a PCH connected to the master CPU, or a Flash that is connected to the PCH connected to the master CPU; and a restarting unit 202 configured to, when the server starts abnormally, trigger the server to restart, and trigger the configuring unit 201 to configure the normal CPU or the CPU connected to the normal PCH as the master CPU.

Figure 3:
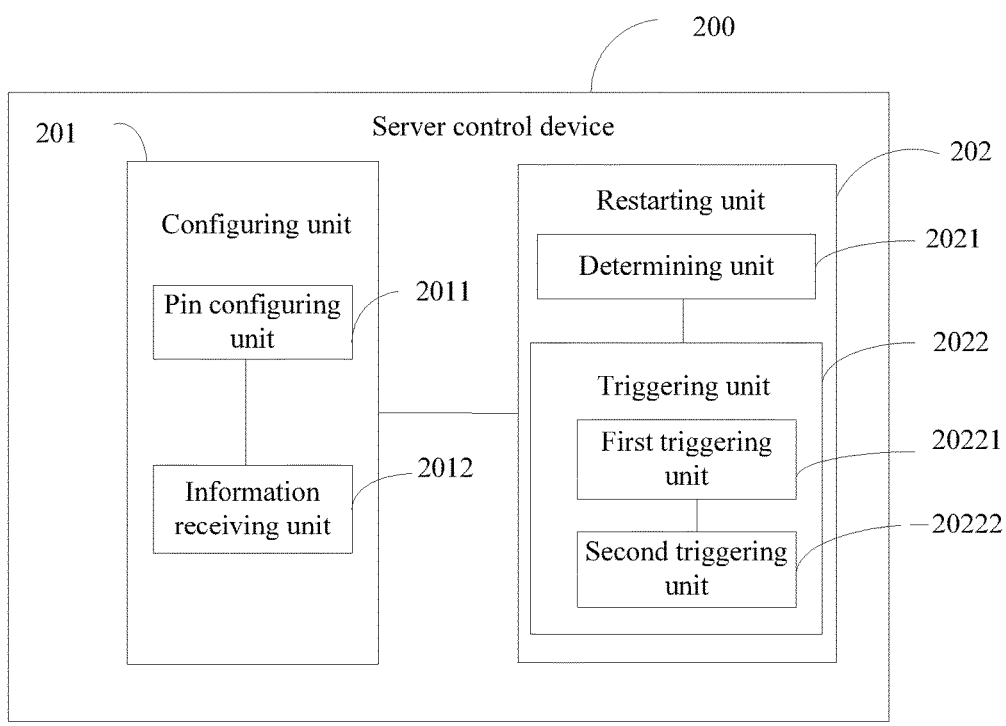
FIG. 3 is a schematic structural diagram of a server control device in other specific implementation manner according to an embodiment of the present invention.

As an optional implementation manner, as shown in FIG. 3, the configuring unit 201 includes a pin configuring unit 2011 configured to configure pins of the at least two CPUs, and configure one of the CPUs as the master CPU by configuring values of the pins; and an information receiving unit 2012 configured to receive information that is about a startup exception of the server and sent by the restarting unit 202, and trigger the pin configuring unit 2011 to configure the normal CPU or the CPU connected to the normal PCH as the master CPU.

As an optional implementation manner, the restarting unit 202 includes a determining unit 2021 configured to determine whether the server starts abnormally within preset time; and a triggering unit 2022 configured to, when the determining unit 2021 determines that the server starts abnormally, trigger the server to restart, and trigger the configuring unit 201 to configure the normal CPU or the CPU connected to the normal PCH as the master CPU.

As an optional implementation manner, the triggering unit 2022 includes a first triggering unit 20221 configured to, when the server starts abnormally, trigger, using a register preset in the BIOS, the server to restart; and a second triggering unit 20222 configured to, in a restart process of the server, determine whether exception information that causes the server to abnormally start exists; and when the exception information exists, trigger the configuring unit 201 to configure the normal CPU or the CPU connected to the normal PCH as the master CPU, where the exception information is information triggered, by the BIOS, to be recorded before the server restarts.

As an optional implementation manner, the control device in this embodiment of the present invention is implemented in a CPLD or an FPGA of the server.

As an optional implementation manner, the server in this embodiment of the present invention is a server that supports a hard partitioning function, and the pins of the CPUs in the server are connected to the control device. The control device in the server may be connected to a CPU in the server using an System Management Bus (SMBUS), a Low Pin Count (LPC) bus, or the like. The control device implements configuration of the pins of the CPU using the SMBUS or the LPC bus.

The server that supports the hard partitioning function in this embodiment of the present invention refers to a server that supports separation of one server into several completely independent subservers. A subserver may be considered as one independent server system that includes an independent BIOS, PCH, CPU, operating system, and the like. For example, one 8-socket X86 server is hard partitioned into two 4-socket subservers or four 2-socket subservers, and a server that is obtained by separation by means of hard partitioning can run independently, be powered on independently, be powered off independently, and be managed independently. The 8-socket server refers to a server that includes eight CPUs, the 4-socket subserver refers to a subserver that includes four CPUs, and the 2-socket subserver refers to a subserver that includes two CPUs.

That one 8-socket server is hard partitioned into two 4-socket subservers is used as an example in the following to further describe an implementation manner of a control device in a server according to an embodiment of the present invention. In this embodiment, that the control device is implemented in a CPLD is used as an example for description.

Figure 4:
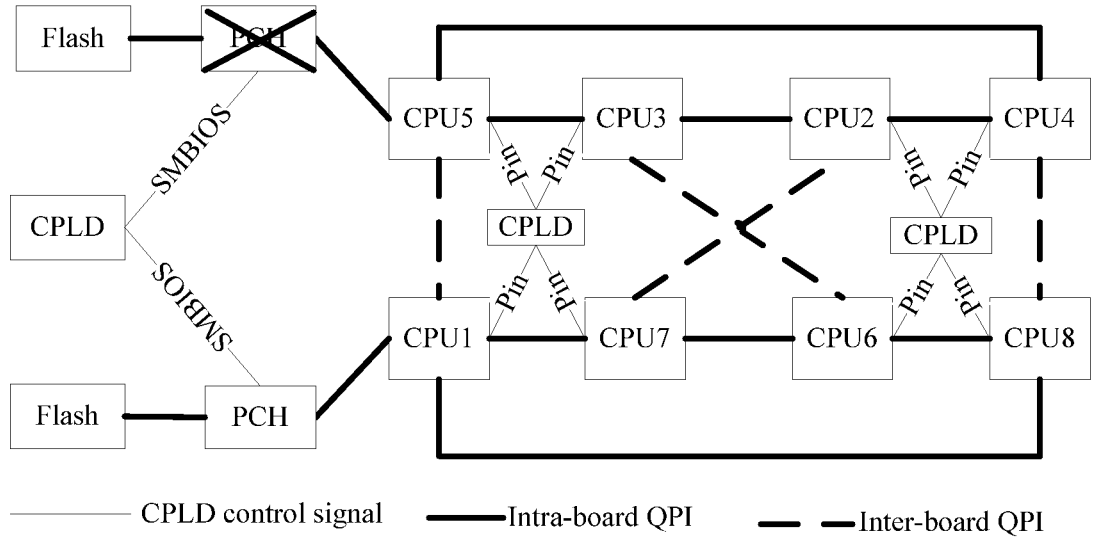
FIG. 4 is a schematic structural diagram of basic hardware of an 8-socket server according to an embodiment of the present invention.

FIG. 4 is a schematic structural diagram of basic hardware of an 8-socket server. The 8-socket server is an X86 server that supports a hard partitioning function and includes eight CPUs, two PCHs, and Flashes connected to the PCHs. Pins of the eight CPUs are connected to the CPLD, and the CPLD implements management of the CPUs by configuring the pins of the CPUs, for example, configuring a CPU as a master CPU. The 8-socket server may include multiple PCHs. As a common implementation manner, if the server is hard partitioned into two 4-socket subservers, the 8-socket server includes only two PCHs, and each PCH is connected to one CPU of one subserver. Assume that a CPU5 in FIG. 4 is the master CPU, and then a PCH connected to the CPU5 is a master PCH, and a PCH connected to a CPU1 is a slave PCH. The slave PCH generally has two working modes: (1) The PCH is disabled and cannot provide any function externally. (2) The PCH is in a state in which some functions are available, for example, a USB or SATA function on the PCH is available but the PCH cannot participate in a management function of the entire server.

In the server shown in the foregoing FIG. 4, four CPUs (CPU5, CPU3, CPU2, CPU4) and a PCH that are at the top form one independent subserver, and four CPUs (CPU1, CPU7, CPU6, CPU8) and a PCH that are at the bottom form one independent subserver. QPI connections between the two subservers are disconnected (that is, a QPI port is disabled using an internal register), and there is no task interaction between the two subservers.

The CPUs in the server are identified using their SOCKET_ID pins. The SOCKET_ID pin of each CPU needs to be connected to a configuring unit 201 of a CPLD. The configuring unit 201 configures a SOCKET_ID pin value of each CPU according to an actual requirement. As an optional implementation manner, pin configurations of the CPUs that are shown in FIG. 4 may be that: SOCKET_ID=0 indicates that the CPU is a processor 1, SOCKET_ID=1 indicates a processor 2, and by analogy, SOCKET_ID=7 indicates a processor 8. In addition, a pin EX_LEGACY_SKT is used to differentiate whether a CPU is a master processor or a common processor. If SOCKET_ID of a pin to which a CPU is connected is 0, it indicates that the CPU is a master CPU, and EX_LEGACY_SKT needs to be set to 1; otherwise, the pin EX_LEGACY_SKT is set to 0, which indicates that the CPU is a common CPU. To implement configuration of the CPU pins by the CPLD, the CPLD may be connected to the CPUs using an SMBUS bus or an LPC bus.

That the CPU5 on the leftmost of the upper row in FIG. 4 is the master CPU and the PCH connected to the master CPU can work normally is used as an example for description in the following. The configuring unit 201 in the CPLD configures pins of the CPU5, sets SOCKET_ID of the CPU5 to 0, and sets EX_LEGACY_SKT of the CPU5 to 1. The CPU1 on the leftmost of the lower row is configured as a common processor, that is, SOCKET_ID of the CPU1 is set to 4, and EX_LEGACY_SKT of the CPU1 is set to 0. The PCH connected to the master CPU is the master PCH.

After the server shown in FIG. 4 is powered on, a BIOS in the server automatically acquires an instruction from a Flash connected to the master PCH and executes the instruction. A restarting unit 202 in the CPLD monitors whether the master CPU, the master PCH, and the Flash connected to the master PCH are normal. If all of the master CPU, the master PCH, and the Flash connected to the master PCH are normal, a BIOS program smoothly carries on execution and guides a system to an OS operating system. If the master CPU, the master PCH, or the Flash connected to the master PCH encounters an exception in a process of BIOS guidance, the restarting unit 202 triggers the server to restart, and triggers the configuring unit 201 to configure a normal CPU or a CPU connected to a normal PCH as the master CPU.

That the restarting unit 202 determines whether the master CPU, the master PCH, or the Flash connected to the master PCH is abnormal may be implemented in a manner of setting a timer and setting duration of the timer to be less than timer duration of a watchdog. If the watchdog is not disabled before the timer that is set times out, it is determined that the server starts abnormally. A determining unit 2021 in the restarting unit 202 determines whether the watchdog is disabled within the set time. If the watchdog is not disabled or reset, it is determined that the server starts abnormally. Accordingly, based on that the determining unit 2021 determines the server is abnormal, a triggering unit 2022 in the control device triggers the server to restart, and triggers the configuring unit 201 to configure the normal CPU or the CPU connected to the normal PCH as the master CPU. The CPU1 is configured as the master CPU, SOCKET_ID of the CPU1 is set to 0, and EX_LEGACY_SKT of the CPU1 is set to 1; the CPU5 is configured as a common processor, that is, SOCKET_ID of the CPU5 is set to 4, and EX_LEGACY_SKT of the CPU5 is set to 0.

As an optional implementation manner, when the determining unit 2021 determines that the server starts abnormally, the first triggering unit 20221 in the triggering unit 2022 triggers, based on a restart register preset in the CPLD by the BIOS, the server to restart. Before the server restarts, the BIOS of the server writes exception information into a register, for example, a register of an electrically erasable programmable read-only memory (E2PROM). After the server restarts, the second triggering unit 20222 determines whether the exception information is recorded in a register of the E2PROM, and triggers the configuring unit 201 to reconfigure the SOCKET_ID and EX_LEGACY_SKT pins of each CPU if the exception information exists.

In the foregoing implementation manner of the control device of the server, after pins of CPUs are reconfigured, a master CPU of the server is changed, and a BIOS acquires an instruction from a Flash connected to a new master PCH and executes the instruction at the time of startup. It is implemented that, when a startup exception occurs on a server that supports hard partitioning, it can be still ensured that the server normally starts and runs, thereby improving reliability and stability of the server. Therefore, RAS of the entire server is improved. In addition, a problem that a system fails to run due to an exception of a Flash is solved, and an original dual BIOS design manner may no longer be used, thereby reducing Flash chip costs of the server.

Figure 5:
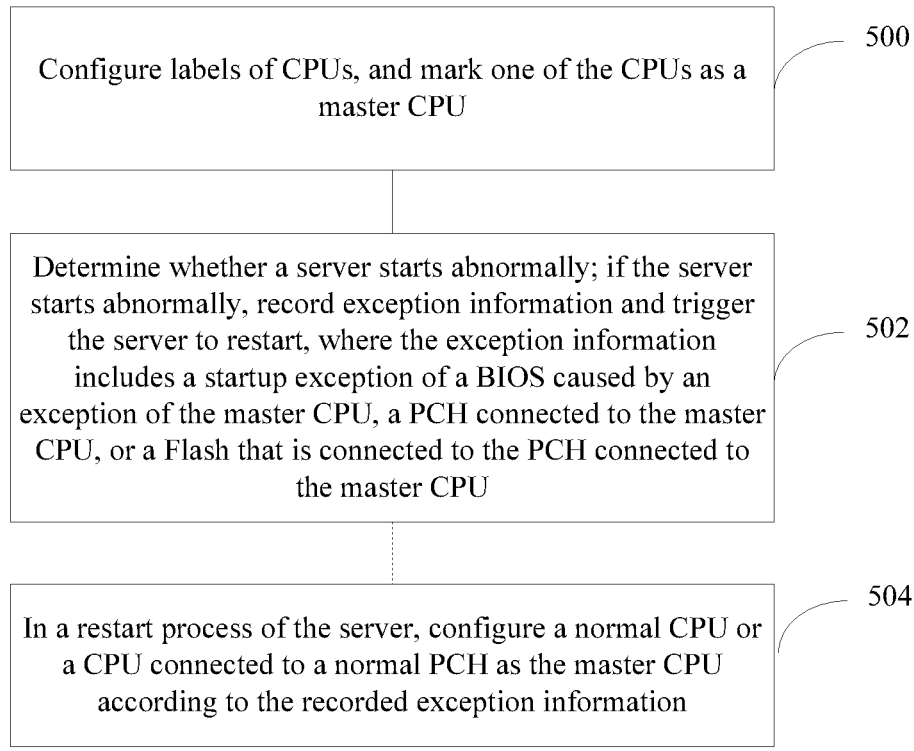
FIG. 5 is a schematic flowchart of a server control method according to an embodiment of the present invention.

FIG. 5 is a schematic flowchart of a server control method according to an embodiment of the present invention. The method is applied to a server, where the server includes at least two CPUs and at least two PCHs, and each of the PCHs is connected to at least one of the CPUs; the method includes the following steps.

Step 500: Configure labels of the CPUs, and mark one of the CPUs as a master CPU.

Step 502: Determine whether the server starts abnormally; if the server starts abnormally, record exception information and trigger the server to restart, where the exception information includes a startup exception of a BIOS caused by an exception of the master CPU, a PCH connected to the master CPU, or a Flash that is connected to the PCH connected to the master CPU.

Step 504: In a restart process of the server, configure a normal CPU or a CPU connected to a normal PCH as the master CPU according to the recorded exception information.

The server control method according to this embodiment of the present invention is implemented by a logical chip, such as a CPLD or an FPGA in the server. In this embodiment of the present invention, that the server control method is implemented by the CPLD is used as an example for description.

In the step 500, the configuring labels of the CPUs is configuring pins of the CPUs, and the marking one of the CPUs as a master CPU is configuring one of the CPUs as the master CPU by configuring values of the pins.

The configuring pins of the CPUs may be implemented by configuring a value of SOCKET_ID and a value of EX_LEGACY_SKT, where SOCKET_ID is used to identify a different CPU, and EX_LEGACY_SKT is used to identify whether a CPU is a master CPU or a common CPU. For example, in the server in FIG. 4, SOCKET_ID=0 indicates that the CPU is a processor 1, SOCKET_ID=1 indicates a processor 2, and by analogy, SOCKET_ID=7 indicates a processor 8. If the CPU with SOCKET_ID 0 is a master CPU, EX_LEGACY_SKT of the CPU is set to 1, and values of EX_LEGACY_SKT of other CPUs are set to 0.

As an optional implementation manner, in the step 502, the determining whether the server starts abnormally includes setting a timer, where duration of the timer is less than timer duration of a watchdog of the server; and in a startup process of the server, if the watchdog is not disabled within time that is set for the timer, determining that the server starts abnormally.

In the step 502, the triggering the server to restart may be triggering, using a restart register disposed in a CPLD chip, the server to restart. As an optional implementation manner, the restart register may be disposed in the CPLD chip or the FPGA by the BIOS.

In the step 502, the recording exception information may be implemented by recording the exception information in a register, such as a register of an E2PROM. Certainly, the exception information may also be recorded in another place on the server, and a location in which the exception information is recorded is not limited by this embodiment of the present invention. As an optional implementation manner, the exception information is recorded by the BIOS, for example, the BIOS records the exception information in a register of the E2PROM.

Accordingly, in step 504, the CPLD determines whether the exception information is recorded in the register of the E2PROM; if the exception information exists, a SOCKET_ID pin value and an EX_LEGACY_SKT pin value of each CPU are reconfigured. For example, the CPU1 in FIG. 4 is configured as the master CPU, SOCKET_ID of the CPU1 is set to 0, and EX_LEGACY_SKT of the CPU1 is set to 1; the CPU5 is configured as a common processor, that is, SOCKET_ID of the CPU5 is set to 4, and EX_LEGACY_SKT of the CPU5 is set to 0.

As an optional implementation manner, the server in the server control method in this embodiment of the present invention is a server that supports a hard partitioning function, and the pins of the CPUs in the server are connected to a control device. The control device in the server may be connected to a CPU in the server using an SMBUS bus, an LPC bus, or the like. The control device implements configuration of the pins of the CPU using the SMBUS bus or the LPC bus.

Using the foregoing server control method, it is implemented that, when a startup exception occurs on a server that supports hard partitioning, it can be still ensured that the server normally starts and runs, thereby improving reliability and stability of the server. Therefore, RAS of the entire server is improved. In addition, a problem that a system fails to run due to an exception of a Flash is solved, and an original dual BIOS design manner may no longer be used, thereby reducing Flash chip costs of the server.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A control device in a server, the server comprising at least two central processing units (CPUs) and at least two Platform Controller Hubs (PCHs), and each of the PCHs coupled to at least one of the CPUs, the control device comprising:
   a memory comprising instructions; and
   a processor coupled to the memory, the instructions causing the processor to be configured to:
      couple pins of each of the at least two CPUs to a complex programmable logical device (CPLD);
      configure labels of the CPUs using the pins coupled to the CPLD to mark one of the CPUs as a master CPU;
      record startup exception information in a register of an electrically erasable programmable read-only memory (EEPROM) of the server when a startup exception occurs, the startup exception comprising a startup exception of a basic input/output system (BIOS) caused by an exception of the master CPU, a PCH coupled to the master CPU, or a Flash that is coupled to the PCH coupled to the master CPU;
      read the register of the EEPROM of the server when restarting the server;
      configure a CPU or a CPU coupled to a PCH as the master CPU using the pins coupled to the CPLD when the startup exception information is read from the register of the EEPROM of the server, the pins coupled to the CPLD comprising a SOCKET_ID pin and an EX_LEGACY pin, a value of the SOCKET_ID pin indicating an identity of the CPU or the CPU coupled to the PCH, a value of the EX_LEGACY pin indicating whether the CPU or the CPU coupled to the PCH is a master processor or a common processor, and the CPLD configuring the CPU or the CPU coupled to the PCH as the master CPU by changing the value of the SOCKET_ID pin and the value of the EX_LEGACY pin;
      switch the PCH to a new master PCH;
      acquire a BIOS instruction from a Flash coupled to the new master PCH; and
      trigger the server to restart using the BIOS instruction when the startup exception information is read from the register of the EEPROM of the server.

2. The control device in the server of claim 1, wherein the instructions further cause the processor to be configured to:
   determine whether the server starts abnormally within a preset time; and
   trigger the server to restart when the server starts abnormally.

3. The control device in the server of claim 1, wherein the server is a server that supports a hard partitioning function, and pins of the CPUs in the server are coupled to the control device.

4. The control device in the server of claim 1, wherein the control device is implemented in the CPLD.

5. The control device in the server of claim 1, wherein the control device is implemented in a field programmable gate array (FPGA) of the server.

6. A server control method applied to a server, the server comprising at least two central processing units (CPUs) and at least two Platform Controller Hubs (PCHs), and each of the PCHs coupled to at least one of the CPUs, the method comprising:
   coupling pins of each of the at least two CPUs to a complex programmable logical device (CPLD);
   configuring labels of the CPUs using the pins coupled to the CPLD;

marking one of the CPUs as a master CPU using the pins coupled to the CPLD;

recording startup exception information in a register of an electrically erasable programmable read-only memory (EEPROM) of the server when a startup exception occurs, the startup exception comprising a startup exception of a basic input/output system (BIOS) caused by an exception of the master CPU, a PCH coupled to the master CPU, or a Flash that is coupled to the PCH coupled to the master CPU;

reading the register of the EEPROM of the server when restarting the server;

triggering the server to restart when the startup exception information is read from the register of the EEPROM of the server;

configuring, in a restart process of the server using the pins coupled to the CPLD, a CPU or a CPU coupled to a PCH as the master CPU according to the recorded exception information, the pins coupled to the CPLD comprising a SOCKET_ID pin and an EX_LEGACY pin, a value of the SOCKET_ID pin indicating an identity of the CPU or the CPU coupled to the PCH, a value of the EX_LEGACY pin indicating whether the CPU or the CPU coupled to the PCH is a master processor or a common processor, and the CPLD configuring the CPU or the CPU coupled to the PCH as the master CPU by changing the value of the SOCKET_ID pin and the value of the EX_LEGACY pin;

switching the PCH to a new master PCH;

acquiring a BIOS instruction from a Flash coupled to the new master PCH; and triggering the server to restart using the BIOS instruction when the startup exception information is read from the register of the EEPROM of the server.

7. The server control method of claim 6, wherein determining whether the server starts abnormally comprises:

setting a timer, a duration of the timer being less than timer duration of a watchdog of the server; and determining, in a startup process of the server, that the server starts abnormally when the watchdog is not disabled within time that is set for the timer.

8. The server control method of claim 6, wherein the method is implemented by the CPLD.

9. The server control method of claim 8, wherein triggering the server to restart comprises triggering, using a restart register disposed in the CPLD, the server to restart.

10. The server control method of claim 8, wherein the server is a server that supports a hard partitioning function, and pins of the CPUs in the server are coupled to the CPLD.

11. The server control method of claim 6, wherein the method is implemented by a field programmable gate array (FPGA).

12. The server control method of claim 11, wherein triggering the server to restart comprises triggering, using a restart register disposed in the FPGA, the server to restart.

13. The server control method of claim 11, wherein the server is a server that supports a hard partitioning function, and pins of the CPUs in the server are coupled to the FPGA.

14. A server control method, comprising:

configuring a pin of a first central processing unit (CPU) to label the first CPU as a master CPU;

monitoring whether a startup exception occurs in the first CPU, a first Platform Controller Hub (PCH) coupled to the first CPU, or a first Flash device coupled to the first PCH;

recording startup exception information in a register of an electrically erasable programmable read-only memory (EEPROM) of a server when the startup exception occurs, the startup exception comprising a startup exception of a basic input/output system (BIOS) caused by an exception of the master CPU, the first PCH coupled to the master CPU, or the first Flash device that is coupled to the PCH coupled to the master CPU;

reading the register of the EEPROM of the server when restarting the server;

reconfiguring pins of a second CPU to label the second CPU as the master CPU when the startup exception information is read from the register of the EEPROM of the server, the pins of the second CPU being reconfigured by reconfiguring a value of a SOCKET_ID pin and a value of an EX_LEGACY_SKT pin of the second CPU, the value of the SOCKET_ID pin indicating an identity of the second CPU, and the value of the EX_LEGACY pin indicating whether the second CPU is a master processor or a common processor; and restarting the server with the second CPU as the master CPU.

15. The method of claim 14, further comprising reconfiguring a second PCH coupled to the second CPU and a second Flash device coupled to the second PCH as a master PCH and a master Flash drive when reconfiguring the pin of the second CPU to label the second PCU as the master CPU.

16. The method of claim 14, wherein the server is hard partitioned, the server comprises a first subserver and a second subserver, the first subserver comprises the first CPU, and the second subserver comprises the second CPU.

* * * * *